US008843360B1

(12) United States Patent
Johnston et al.

(10) Patent No.: US 8,843,360 B1
(45) Date of Patent: Sep. 23, 2014

(54) CLIENT-SIDE LOCALIZATION OF NETWORK PAGES

(75) Inventors: Simon K. Johnston, Snohomish, WA (US); Margaux Eng, Settle, WA (US); James K. Keiger, Seattle, WA (US); Gideon Shavit, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 226 days.

(21) Appl. No.: 13/040,492

(22) Filed: Mar. 4, 2011

(51) Int. Cl.
| | |
|---|---|
| G06F 17/20 | (2006.01) |
| G06F 17/28 | (2006.01) |
| G06F 17/21 | (2006.01) |
| G06F 17/27 | (2006.01) |
| G10L 21/00 | (2013.01) |
| G10L 25/00 | (2013.01) |
| G06F 17/00 | (2006.01) |
| G06F 17/22 | (2006.01) |
| G06F 17/25 | (2006.01) |
| G06F 17/26 | (2006.01) |

(52) U.S. Cl.
USPC ........... 704/8; 704/1; 704/2; 704/3; 704/4; 704/5; 704/6; 704/7; 704/9; 704/10; 715/205; 715/215; 715/236; 715/265

(58) Field of Classification Search
USPC ......... 704/1–10, 277; 715/205, 215, 236, 265
See application file for complete search history.

(56) References Cited

U.S. PATENT DOCUMENTS

| | | | | |
|---|---|---|---|---|
| 5,625,553 A | * | 4/1997 | Kutsumi et al. ................ 704/2 |
| 6,119,078 A | * | 9/2000 | Kobayakawa et al. ......... 704/3 |
| 6,311,194 B1 | * | 10/2001 | Sheth et al. ................... 715/236 |
| 6,604,101 B1 | * | 8/2003 | Chan et al. .................... 707/706 |
| 6,999,916 B2 | * | 2/2006 | Lin et al. ........................ 704/8 |
| 7,016,977 B1 | * | 3/2006 | Dunsmoir et al. ........... 709/246 |
| 7,475,390 B2 | * | 1/2009 | Berstis et al. ................ 717/136 |
| 7,490,167 B2 | * | 2/2009 | Pena et al. .................... 709/246 |
| 7,681,127 B2 | * | 3/2010 | Thurston ...................... 715/265 |
| 7,877,251 B2 | * | 1/2011 | Kumaran et al. .............. 704/2 |
| 2002/0188435 A1 | * | 12/2002 | Labarge ........................ 704/1 |
| 2003/0084401 A1 | * | 5/2003 | Abel et al. ................. 715/501.1 |
| 2003/0126559 A1 | * | 7/2003 | Fuhrmann ..................... 715/513 |
| 2004/0049374 A1 | * | 3/2004 | Breslau et al. ................. 704/2 |
| 2004/0205118 A1 | * | 10/2004 | Yu ................................. 709/203 |
| 2004/0260535 A1 | * | 12/2004 | Chen et al. .................... 704/9 |
| 2005/0010419 A1 | * | 1/2005 | Pourhamid ................... 704/277 |
| 2005/0075858 A1 | * | 4/2005 | Pournasseh et al. ........... 704/2 |
| 2005/0262440 A1 | * | 11/2005 | Stanciu et al. ............... 715/523 |
| 2006/0059424 A1 | * | 3/2006 | Petri et al. .................... 715/530 |
| 2007/0055489 A1 | * | 3/2007 | Annic et al. ................... 704/2 |
| 2007/0061129 A1 | * | 3/2007 | Barreiro ........................ 704/9 |
| 2007/0250509 A1 | * | 10/2007 | Marti et al. .................... 707/9 |
| 2008/0040094 A1 | * | 2/2008 | Wolgemuth et al. ........... 704/2 |
| 2008/0052063 A1 | * | 2/2008 | Bennett et al. ................. 704/8 |
| 2008/0221867 A1 | * | 9/2008 | Schreiber ...................... 704/8 |
| 2008/0288239 A1 | * | 11/2008 | Bailey et al. ................... 704/2 |

(Continued)

Primary Examiner — Pierre-Louis Desir
Assistant Examiner — Anne Thomas-Homescu
(74) Attorney, Agent, or Firm — Thomas | Horstemeyer, LLP

(57) ABSTRACT

Disclosed are various embodiments for client-side internationalization of network pages. A network page and code that localizes the network page are obtained from a server. The code that localizes the network page is executed in a client and determines a locale associated with the client. One or more internationalized elements are identified in the network page. The internationalized elements are replaced with corresponding localized translations. The network page is rendered for display in the client after the network page has been localized.

23 Claims, 6 Drawing Sheets

(56) References Cited

U.S. PATENT DOCUMENTS

| | | | |
|---|---|---|---|
| 2008/0300859 A1* | 12/2008 | Chen et al. | 704/7 |
| 2009/0043563 A1* | 2/2009 | Bode et al. | 704/3 |
| 2009/0192783 A1* | 7/2009 | Jurach et al. | 704/4 |
| 2009/0327866 A1* | 12/2009 | Li et al. | 715/234 |
| 2010/0107114 A1* | 4/2010 | Zachcial | 715/780 |
| 2010/0305940 A1* | 12/2010 | Dendi et al. | 704/3 |
| 2011/0191703 A1* | 8/2011 | Doser et al. | 715/763 |
| 2012/0054599 A1* | 3/2012 | Nixon et al. | 715/236 |
| 2012/0054619 A1* | 3/2012 | Spooner et al. | 715/723 |
| 2013/0144600 A1* | 6/2013 | Jiang et al. | 704/3 |
| 2013/0253911 A1* | 9/2013 | Petri et al. | 704/9 |

\* cited by examiner

CLIENT-SIDE LOCALIZATION OF NETWORK PAGES

BACKGROUND

Internationalization refers to a process of designing a software application so that it may be adapted to multiple languages. Localization refers to the process of adapting internationalized software for a specific region or language by adding locale-specific components or translating text. Web-based applications are facing increasing internationalization and localization issues as increasing global business leads to users who are more geographically diverse. Network sites may, for example, have parallel installations of their software, with the software being pre-translated and prepared for different markets. However, internal applications and other types of applications can rarely justify the cost of parallel application installations, or even development of applications for different locales.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to client-side localization of network pages. Network-based applications, such as, for example, web applications, often need to be provided in multiple languages. One approach to localization of network-based applications may include development of separate applications for each locale or language, which may be very expensive in terms of development time and hosting resources. Another approach to localization of network-based applications may include a server-side approach, where the server constructs network pages piece-by-piece, translating portions of the network pages as needed. Such a server-side approach may be expensive, requiring a substantial investment in server resources for network-based applications that have high request volume.

By contrast, various embodiments of the present disclosure implement localization of network pages through client-side transformations. Elements of a network page are defined in an internationalized format, and code that localizes such internationalized elements is provided to the client in conjunction with the network page. The code executing in the client obtains localized translations through translation groupings, or bundles. The code executing in the client then proceeds to replace the internationalized elements with the respective localized translations before the network page is rendered for display. In the following discussion, a general description of the system and its components is provided, followed by a discussion of the operation of the same.

Figure 1:
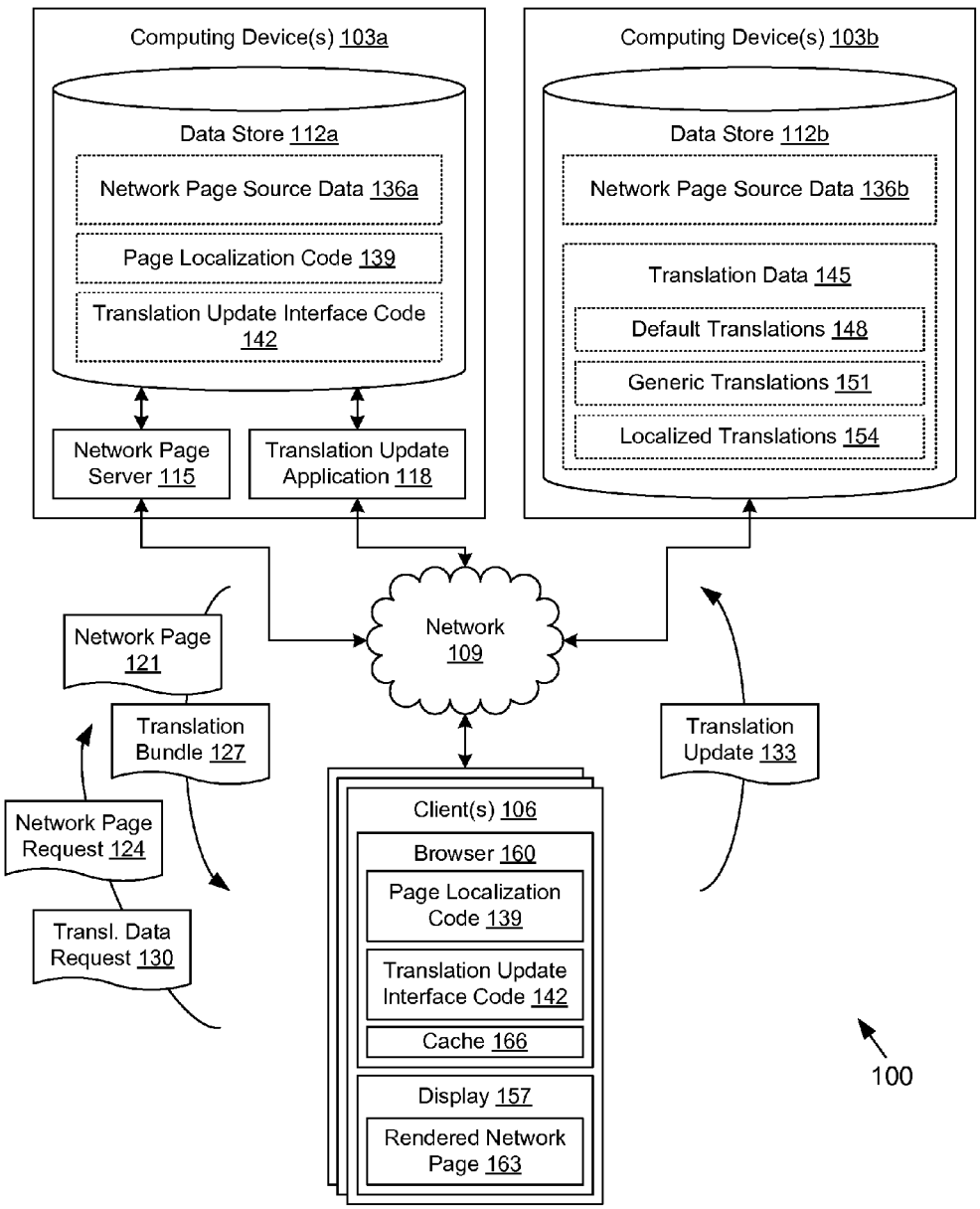
FIG. 1 is a drawing of a networked environment according to various embodiments of the present disclosure.

With reference to FIG. 1, shown is a networked environment 100 according to various embodiments. The networked environment 100 includes one or more computing devices 103a, 103b in data communication with one or more clients 106 by way of a network 109. The network 109 includes, for example, the Internet, intranets, extranets, wide area networks (WANs), local area networks (LANs), wired networks, wireless networks, or other suitable networks, etc., or any combination of two or more such networks.

Each computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though each computing device 103 is referred to in the singular, it is understood that a plurality of computing devices 103 may be employed in the various arrangements as described above. Although two computing devices 103a and 103b are shown, it is understood that a single computing device 103 may be employed in some embodiments.

Various applications and/or other functionality may be executed in the computing device 103 according to various embodiments. Also, various data is stored in a corresponding data store 112a, 112b that is accessible to the computing device 103. Although two data stores 112a and 112b are depicted, one data store 112 may be employed in some embodiments. The data store 112 may be representative of a plurality of data stores 112 as can be appreciated. The data stored in the data store 112, for example, is associated with the operation of the various applications and/or functional entities described below.

The components executed on the computing device 103, for example, include a network page server 115, a translation update application 118, and other applications, services, processes, systems, engines, or functionality not discussed in detail herein. The network page server 115 is executed to serve up network pages 121, such as web pages or other forms of network content, to clients 106 in response to receiving network page requests 124. It is noted that the network pages 121 may correspond to network pages 121 that are generated by a network-based application in some embodiments. The network pages 121 may include internationalized elements that have been configured for client-side localization.

Also, the network page server 115 is executed to serve up translation bundles 127 in response to receiving translation data requests 130. As a non-limiting example, a translation bundle 127 may include a set of key/value pairs that each indicate a translation value corresponding to a key. A translation bundle 127, in one implementation, may correspond to a form defined by the Dojo toolkit, which is a plain JavaScript object using a directory structure containing similarly structured files each representing a different localization. It is noted that a translation bundle 127 may correspond to a single network resource or multiple network resources in various embodiments. The network page server 115 may comprise a commercially available hypertext transfer protocol (HTTP) server such as, for example, Apache® HTTP Server, Apache® Tomcat®, Microsoft® Internet Information Services (IIS), and so on.

The translation update application 118 is executed to update a collection of translations. To this end, the translation update application 118 is configured to receive translation updates 133 from the client 106. In one embodiment, after determining that the client 106 has permission to provide updates to the translation, the translation update application 118 is configured to commit the translation updates 133 to the stored collection of translations.

The data stored in the data store 112 includes, for example, network page source data 136, page localization code 139, translation update interface code 142, translation data 145, and potentially other data. The network page source data 136 includes the source data for the network pages 121 that are served up by the network page server 115. To this end, the network page source data 136 may include hypertext markup language (HTML), extensible markup language (XML), extensible HTML (XHTML), mathematical markup language (MathML), scalable vector graphics (SVG), cascading style sheets (CSS), images, audio, video, graphics, text, and/or any other data that may be used in serving up or generating the network pages 121. In some embodiments, the network page source data 136 may be distributed across multiple data stores 112, for example, as network page source data 136*a* and network page source data 136*b*.

The page localization code 139 corresponds to the client-side executable code for localizing the network pages 121. Likewise, the translation update interface code 142 corresponds to the client-side executable code for generating an interface for obtaining updates or corrections for translations from users and submitting them to the translation update application 118 as translation updates 133. The page localization code 139 and/or the translation update interface code 142 may comprise JavaScript, VBScript, Flash or Shockwave plug-ins, and/or other forms of code that may be executable in a client 106. In some embodiments, the page localization code 139 and/or the translation update interface code 142 also includes code libraries, such as, for example, libraries associated with the Dojo toolkit or other toolkits.

The translation data 145 may include data relating to various translations of internationalized elements of the network pages 121. For example, the translation data 145 may include default translations 148, generic translations 151, localized translations 154, and/or other data. The default translations 148 may correspond to translations of internationalized elements that are applicable to any language or localization. The generic translations 151 may correspond to translations of internationalized elements into a language but are generic as to region, e.g., "English." The localized translations 154 may correspond to translations of internationalized elements into a specific language and localized for a region, e.g., "British English." The translation bundles 127 may map to storage format(s) employed for the translation data 145 or may be generated from the translation data 145 periodically or on demand.

In one embodiment, the translation data 145 may be stored in a data store 112*b* of a computing device 103*b* that are distinct from the data store 112*a* and the computing device 103*a* that are associated with the other data and applications previously described. In addition, some or all of the network page source data 136 may be stored in the data store 112*b* as network page source data 136*b*. Thus, when a network page 121 is loaded from the network page source data 136*b* on a remote server corresponding to the computing device 103*b*, the specific translation data 145 hosted on the computing device 103*b* may be used to perform the localization.

The client 106 is representative of a plurality of client devices that may be coupled to the network 109. The client 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 106 may include a display 157. The display 157 may comprise, for example, one or more devices such as cathode ray tubes (CRTs), liquid crystal display (LCD) screens, gas plasma-based flat panel displays, LCD projectors, or other types of display devices, etc.

The client 106 may be configured to execute various applications such as a browser 160 and/or other applications. The browser 160 may be executed in a client 106, for example, to access and render network pages, such as web pages, or other network content served up by the computing device 103 and/or other servers, thereby generating a rendered network page 163 on the display 157. The browser 160 may be configured to download and execute the page localization code 139 in order to localize network pages 121 before rendering on the display 157. The browser 160 may also be configured to download and execute the translation update interface code 142 in order to generate an interface that facilitates correction of erroneous translations. The browser 160 may also include a cache 166 for maintaining a cached copy of the page localization code 139, the translation update interface code 142, the translation bundles 127, and/or other data in order to process other network pages 121 without downloading the same data. The client 106 may be configured to execute applications beyond the browser 160 such as, for example, email applications, instant message applications, and/or other applications.

Next, a general description of the operation of the various components of the networked environment 100 is provided. To begin, a client 106 executing a browser 160 sends a network page request 124 to the network page server 115 executing in the computing device 103. In response, the network page server 115 serves up the network page 121 along with the page localization code 139 and potentially other data. The network page 121 that is served up by the network page server 115 is internationalized, but not localized for the locale of the client 106.

In some embodiments, each textual element in the HTML or other language that makes up the network page 121 may be indicated to be internationalized and may contain only a temporary placeholder textual value. As a non-limiting example, the title of the network page 121 may be set to be "Temporary Page Title" and an attribute that indicates internationalization may be present (e.g., "internationalizationKey"). The value of the attribute that indicates internationalization may correspond to a key or identifier for the element (e.g., "pageTitle"). Optionally, an attribute may specify a particular translation bundle 127 to be used in order to designate the source for the translation for the element.

The browser 160 executes the page localization code 139, which postpones rendering of the network page 121. Instead, a loading message or graphic or another type of placeholder may be rendered on the display 157. The page localization code 139 determines the locale associated with the client 106, which may correspond to a preferred language which is customized for a region. Thereafter, the page localization code 139 proceeds to send a translation data request 130 to the network page server 115 and obtain one or more translation bundles 127.

Each translation bundle 127 may include translations for internationalized elements. In one embodiment, a translation bundle 127 corresponds to a JavaScript object defined through JavaScript Object Notation (JSON) with a grouping of translations. For example, a translation bundle 127 for American English may define "pageTitle' as "Truck Tires for Sale," while a translation bundle 127 for British English may define "pageTitle" as "Lorry Tyres for Sale." In some embodiments, multiple localizations may be represented within the same file or translation bundle 127. In some embodiments, the translation bundles 127 may be loaded automatically with the network page 121. In one embodiment, the translation bundles 127 are obtained from the network page server 115 according to a hierarchical directory organization provided by a toolkit such as Dojo. Thus, the translation data 145 may be organized into default translations 148, generic translations 151, and localized translations 154, with the most specific translation being used if available.

The page localization code 139 then queries the document object model (DOM) of the network page 121 for internationalized elements. The page localization code 139 then replaces the placeholder text of the internationalized element with the corresponding localized translation identified in the translation bundle 127 that is most specific to the locale of the client 106. Such translations may correspond to text strings, graphics, and/or other translated data objects. After the internationalized elements are translated, the resulting localized network page 121 may be rendered by the browser 160 for display. In some embodiments, the resulting localized network page 121 may be further transformed by the browser 160 or other code executed by the browser 160 before the network page 121 is rendered in a final form for display.

In one embodiment, the page localization code 139 may be maintained in a cache 166 of the browser 160 so that it need not be downloaded for each network page 121. For example, a cached copy of the page localization code 139 may be used to localize another network page 121 in the client 106. Additionally, translation bundles 127 may also be maintained in the cache 166 where some translations may be used across multiple network pages 121.

In one embodiment, the page localization code 139 may continue to be executed after the network page 121 is initially rendered. For example, the rendered network page 163 may be continually updated by various dynamic elements. As portions of the network page 121 are obtained from the network page server 115, the page localization code 139 may then localize any internationalized elements before updates are rendered on the display 157. As a non-limiting example, the page localization code 139 may render a loading message or other placeholder for a portion of the network page 121 that is being updated until the portion is localized. In some cases, the translation bundles 127 that are used for localizing the portion of the network page 121 may be maintained in the cache 166.

The translations employed in the translation bundles 127 may be manually configured and/or generated automatically on the computing device 103. For example, automated translation code may be employed to generate translations for the translation bundles 127. Such code may introduce errors into the translations. Accordingly, a facility may be provided for users to report translation errors and submit corrections. Translation update interface code 142 may be downloaded to the client 106 for execution in the browser 160. The translation update interface code 142 may be configured to generate a user interface that allows a user to report the translation errors. A translation update 133 may be sent to the translation update application 118, which may commit the update to the translation data 145 and/or record the update for later manual review.

Figure 2:
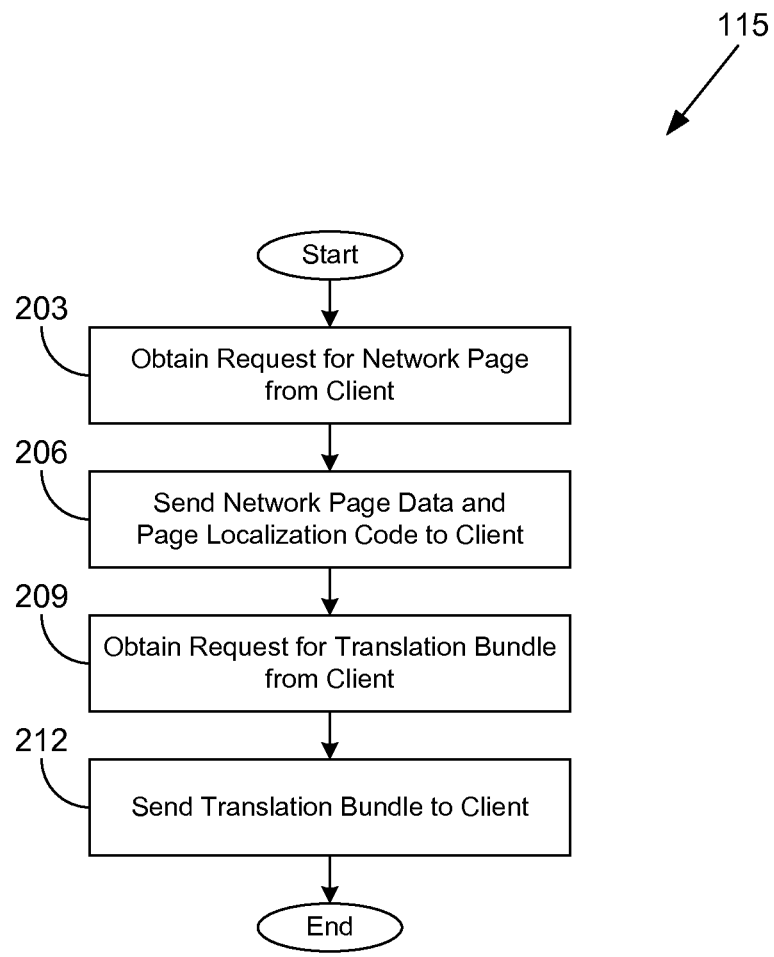
FIG. 2 is a flowchart illustrating one example of functionality implemented as portions of a network page server executed in a computing device in the networked environment of FIG. 1 according to various embodiments of the present disclosure.

Referring next to FIG. 2, shown is a flowchart that provides one example of the operation of a portion of the network page server 115 according to various embodiments. It is understood that the flowchart of FIG. 2 provides merely an example of the many different types of functional arrangements that may be employed to implement the operation of the portion of the network page server 115 as described herein. As an alternative, the flowchart of FIG. 2 may be viewed as depicting an example of steps of a method implemented in the computing device 103 (FIG. 1) according to one or more embodiments.

Beginning with box 203, the network page server 115 obtains a network page request 124 (FIG. 1) from a client 106 (FIG. 1). The network page request 124 may correspond to a request for a static or dynamic network page 121 (FIG. 1), which may, in some cases, be generated by a network-based application. The network page request 124 may be sent over the network 109 (FIG. 1) through the use of HTTP and/or other communications protocols. In box 206, in response to the network page request 124, the network page server 115 generates and serves up data associated with the network page 121 to the client 106. The data may include, for example, HTML, XML, XHTML, MathML, SVG, images, text, and/or other types of network page 121 data from the network page source data 136. In addition, the data may include the page localization code 139 (FIG. 1), the translation update interface code 142 (FIG. 1), and/or other code for execution in the client 106 in association with rendering the network page 121.

In box 209, the network page server 115 obtains a translation data request 130 (FIG. 1), which corresponds to a request for translation data 145 (FIG. 1) to be used by the page localization code 139 to localize the network page 121 before the network page 121 is rendered. In various embodiments, the request for translation data 145 may specify a locale associated with the client 106. In response, in box 212, the network page server 115 sends one or more translation bundles 127 (FIG. 1) to the client 106. The translation bundles 127 may contain translations for internationalized elements of the network page 121, including, for example, default translations 148 (FIG. 1), generic translations 151 (FIG. 1) for the appropriate language, localized translations 154 (FIG. 1) for the appropriate locale, and/or other translations. Thereafter, the portion of the network page server 115 ends.

Figure 3:
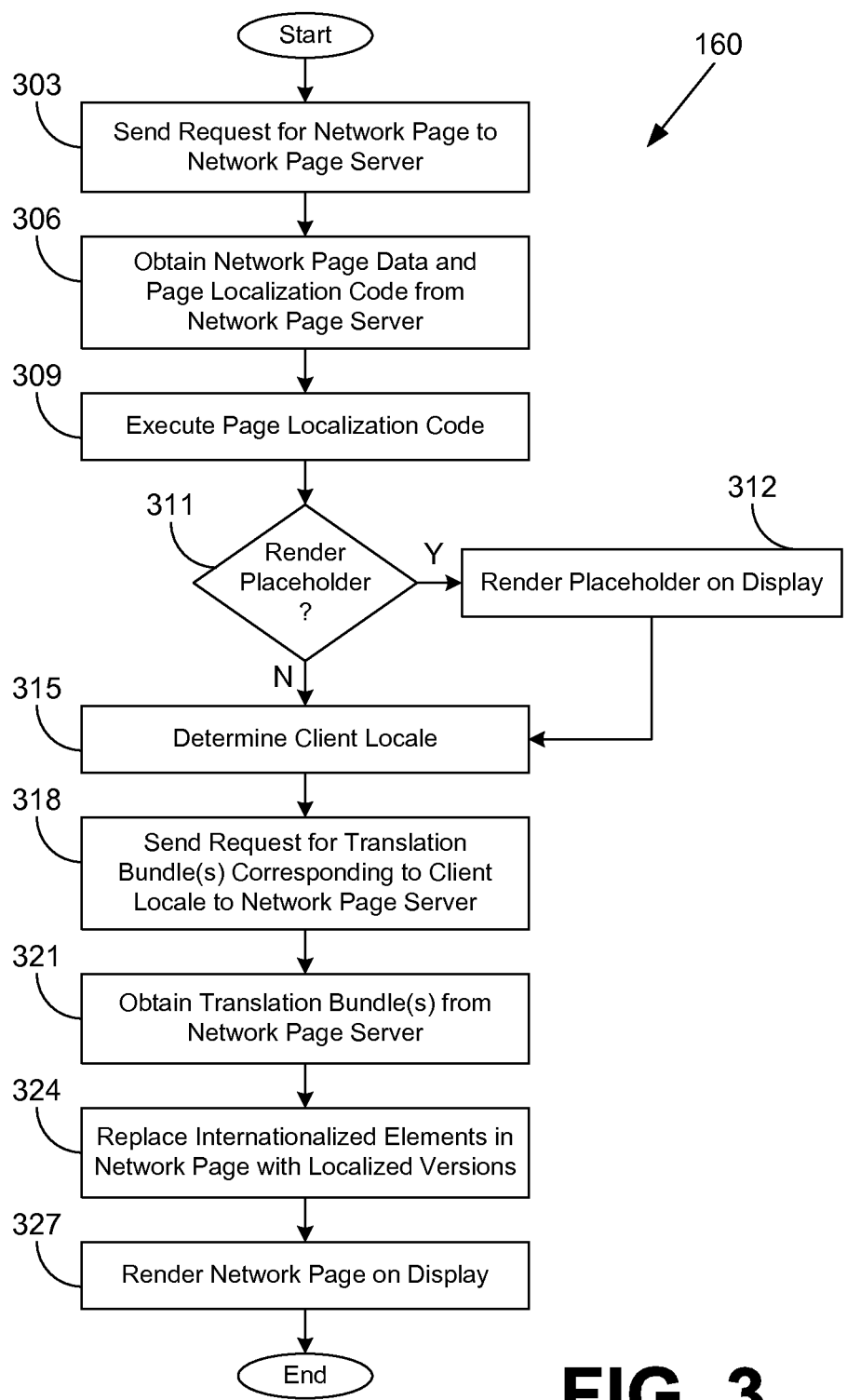
FIGS. 3 and 4 are flowcharts illustrating examples of functionality implemented as portions of a browser executed in a client in the networked environment of FIG. 1 according to various embodiments of the present disclosure.

Turning now to FIG. 3, shown is a flowchart that provides one example of the operation of a portion of the browser 160 as configured by the page localization code 139 (FIG. 1) according to various embodiments. It is understood that the flowchart of FIG. 3 provides merely an example of the many different types of functional arrangements that may be employed to implement the operation of the portion of the browser 160 as described herein. As an alternative, the flowchart of FIG. 3 may be viewed as depicting an example of steps of a method implemented in the client 106 (FIG. 1) according to one or more embodiments.

Beginning with box 303, the browser 160 sends a network page request 124 (FIG. 1) to the network page server 115. In box 306, the browser 160 obtains data for a network page 121 (FIG. 1) from the network page server 115, which may include the page localization code 139. In some cases, the page localization code 139 may be loaded from the cache 166 when it is available in the cache 166. Additionally, code such as the translation update interface code 142 (FIG. 1) and/or other code may be obtained from the network page server 115 in conjunction with the data for the network page 121.

In box 309, the browser 160 begins executing the page localization code 139. In box 311, the page localization code 139 determines whether a placeholder is to be rendered on the display 157 (FIG. 1). If a placeholder is to be rendered, the page localization code 139 executed in the browser 160 proceeds to box 312. In box 312, the page localization code 139 postpones rendering of the network page 121 and instead renders a placeholder on the display 157. In various embodiments, the placeholder may correspond to a loading message or graphic. In some cases, the succeeding tasks may be performed quickly enough that the placeholder is not perceivable by the user.

The page localization code 139 executed in the browser 160 continues to box 315. If the page localization code 139 executed in the browser 160 determines in box 311 that a placeholder will not be rendered, the page localization code 139 also continues to box 315. In box 315, the page localization code 139 executed in the browser 160 determines a locale for the client 106. The page localization code 139 executed in the browser 160 may determine the locale from the browser 160, the operating system of the client 106, a configuration setting in the client 106, and/or by another approach.

In box 318, the page localization code 139 executed in the browser 160 sends a translation data request 130 (FIG. 1) to the network page server 115 that requests one or more translation bundles 127 (FIG. 1) that correspond to the locale determined in box 315. In box 321, the page localization code 139 executed in the browser 160 obtains the translation bundles 127 from the network page server 115. The translation bundles 127 may include default translations 148 (FIG. 1), generic translations 151 (FIG. 1) for the appropriate language, localized translations 154 (FIG. 1) for the appropriate locale, and/or other translations.

In box 324, the page localization code 139 executed in the browser 160 replaces internationalized elements of the network page 121 with localized versions available in the translation bundles 127. To this end, the page localization code 139 executed in the browser 160 may query a document object model (DOM) associated with the network page 121 for attributes that indicate that an element is internationalized. The page localization code 139 executed in the browser 160 may then obtain a key that identifies a translation of the internationalized element in the translation bundles 127. A version that is customized for the locale of the client 106 is used if available. Otherwise, a generic version for the language of the locale may be used. If the generic version in the language is not available, a default version may be used.

Next, in box 327, the browser 160 renders the network page 121 on the display 157 as a rendered network page 163 (FIG. 1), thereby replacing the placeholder or loading message. In the rendered network page 163, the internationalized elements have been replaced with localized elements according to the most specific translation available in the translation data 145 (FIG. 1). Thereafter, the portion of the browser 160 ends. It is noted that subsequent requests for data to update portions of the network page 121 may be sent to the network page server 115, and the obtained data may be processed by the page localization code 139 before the updates are rendered on the display 157.

Figure 4:
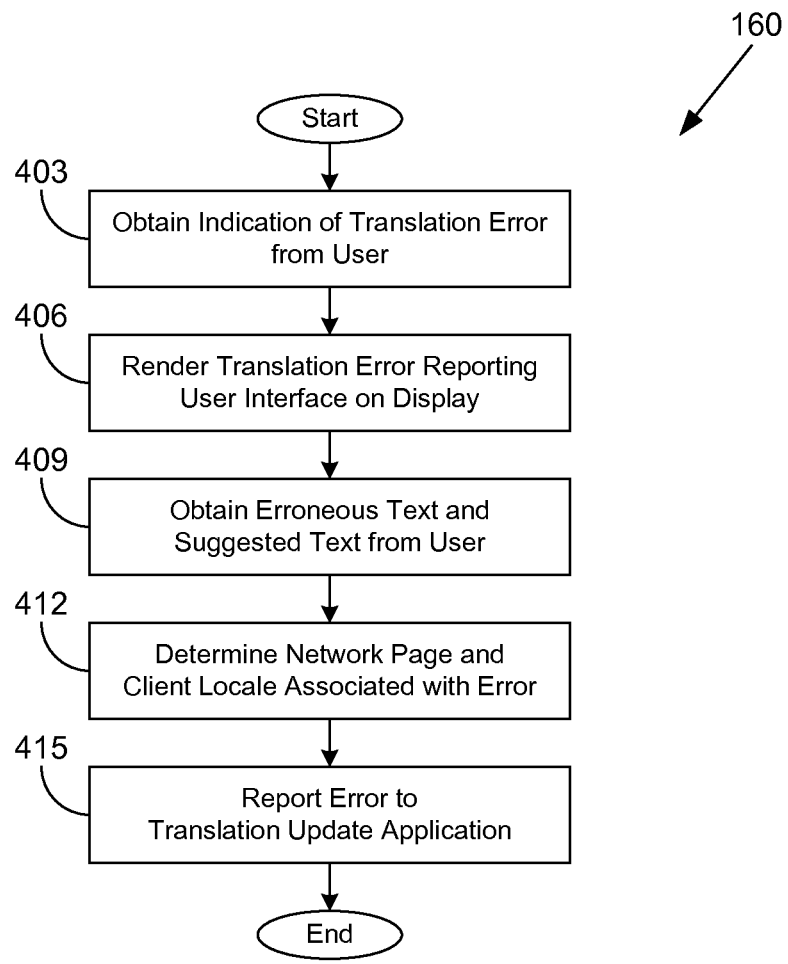

Moving on to FIG. 4, shown is a flowchart that provides one example of the operation of another portion of the browser 160 as configured by the translation update interface code 142 (FIG. 1) according to various embodiments. It is understood that the flowchart of FIG. 4 provides merely an example of the many different types of functional arrangements that may be employed to implement the operation of the portion of the browser 160 as described herein. As an alternative, the flowchart of FIG. 4 may be viewed as depicting an example of steps of a method implemented in the client 106 (FIG. 1) according to one or more embodiments.

Beginning with box 403, the browser 160 obtains an indication of a translation error from a user. For example, a rendered network page 163 may contain a link, button, or other user interface component titled "report translation error," and the user may have activated such a component. In response, in box 406, the browser 160 executing the translation update interface code 142 renders a translation error reporting user interface on the display 157 (FIG. 1). In various embodiments, the translation error reporting user interface may correspond to a rendered network page 163 displayed, for example, as a new window, a pop-up window, a pop-over window, and/or another type of window. The translation error reporting user interface may include, for example, a component for specifying the erroneous text on the rendered network page 163, a component for specifying the replacement, or suggested, text for the erroneous text, a component indicating the address of the rendered network page 163, a component indicating the locale of the client 106, and/or other components. In one embodiment, a user may be able to select the erroneous text by highlighting and right-clicking with a mouse device and/or performing another type of selection action.

In box 409, the browser 160 executing the translation update interface code 142 obtains the erroneous text and the suggested text from the user. In box 412, the browser 160 executing the translation update interface code 142 determines the network page 121 (FIG. 1) and the locale associated with the error. In box 415, the browser 160 executing the translation update interface code 142 reports the error in a translation update 133 (FIG. 1) to the translation update application 118 (FIG. 1) in the computing device 103 (FIG. 1). Thereafter, the portion of the browser 160 ends.

Figure 5:
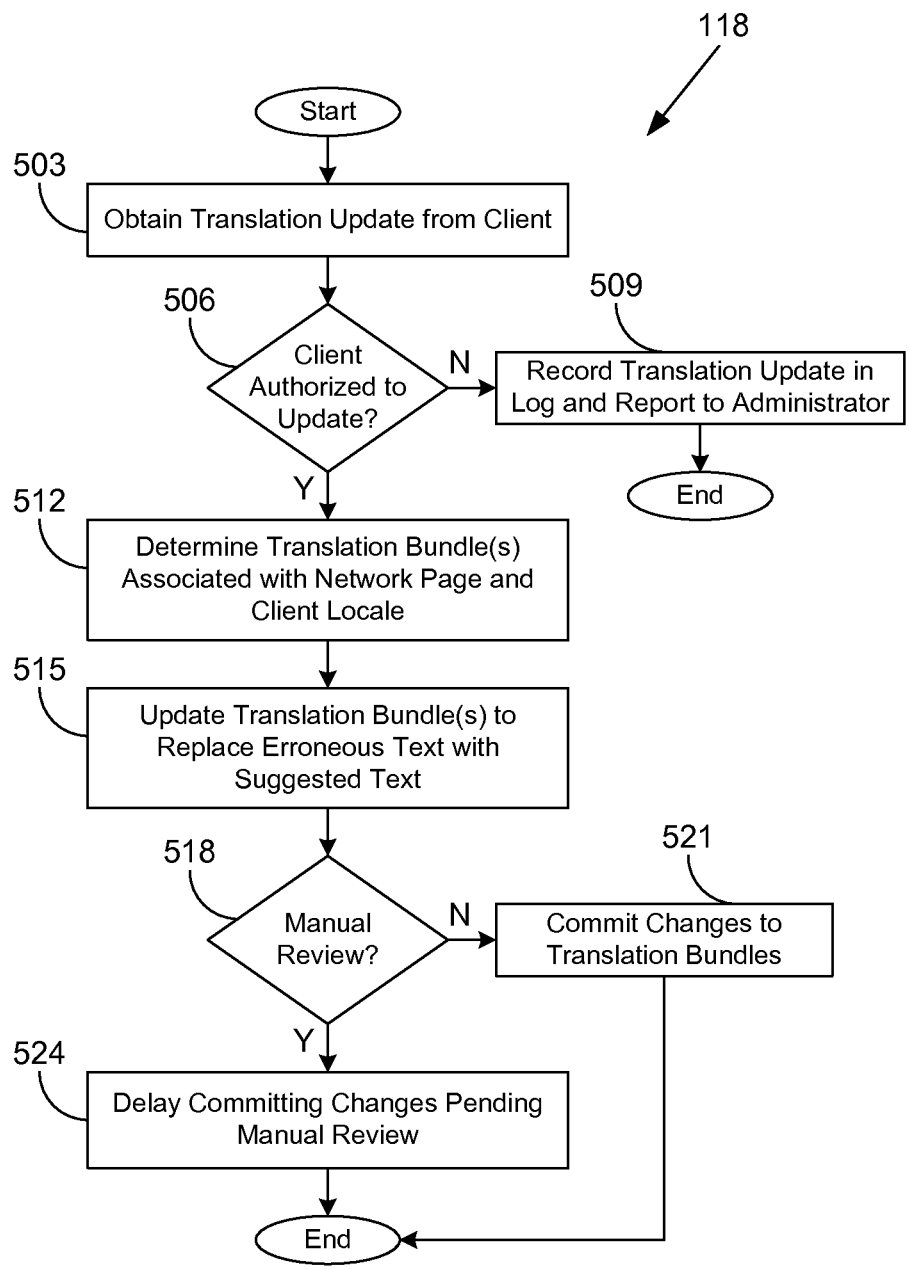
FIG. 5 is a flowchart illustrating one example of functionality implemented as portions of a translation update application executed in a computing device in the networked environment of FIG. 1 according to various embodiments of the present disclosure.

Continuing to FIG. 5, shown is a flowchart that provides one example of the operation of a portion of the translation update application 118 according to various embodiments. It is understood that the flowchart of FIG. 5 provides merely an example of the many different types of functional arrangements that may be employed to implement the operation of the portion of the translation update application 118 as described herein. As an alternative, the flowchart of FIG. 5 may be viewed as depicting an example of steps of a method implemented in the computing device 103 (FIG. 1) according to one or more embodiments.

Beginning with box 503, the translation update application 118 obtains a translation update 133 (FIG. 1) from a client 106 (FIG. 1). The translation update 133 may specify, for example, an identifier of an internationalized element to be updated, a network page 121 (FIG. 1) containing the error, a locale associated with the error, the erroneous text, replacement or suggested text for the erroneous text, security credentials for the user, and/or other data. In box 506, the translation update application 118 determines whether the client 106 is authorized to update the translation data 145 (FIG. 1). If the client 106 does not have permission or is not authorized to update the translation data 145, the translation update application 118 moves to box 509 and records the translation update in a log and reports it to an administrator or another user for manual review. In some embodiments, an error or other notification message may be generated and sent to the client 106. Thereafter, the portion of the translation update application 118 ends.

Otherwise, if the client 106 does have permission or is authorized to update the translation data 145, the translation update application 118 proceeds to box 512. In box 512, the translation update application 118 determines the translation bundles 127 (FIG. 1) that are associated with the network page 121 and the locale of the client 106. In box 515, the translation update application 118 generates updated versions of the translation bundles 127 to replace the erroneous text with the suggested text. It is noted that multiple locales may be affected, as a generic translation 151 or default translation 148 may be used for multiple locales. In one embodiment, the suggested text is used only for the locale that is associated with the client 106 and not for other locales, where the suggested text may be incorrect.

In various embodiments, the updated translation bundles 127 may be held in a temporary location before being committed. In box 518, the translation update application 118 determines whether a manual review is to be performed before the updates to the translation bundles 127 are committed. If no manual review is to be performed, the translation update application 118 proceeds to box 521. In box 521, the translation update application 118 commits the changes to the translation bundles 127. Thereafter, the portion of the translation update application 118 ends. Otherwise, if a manual review is to be performed, in box 524, the translation update application 118 delays committing the changes to the translation bundles 127 pending a manual review of the changes by an administrator or another user. Thereafter, the portion of the translation update application 118 ends.

Figure 6:
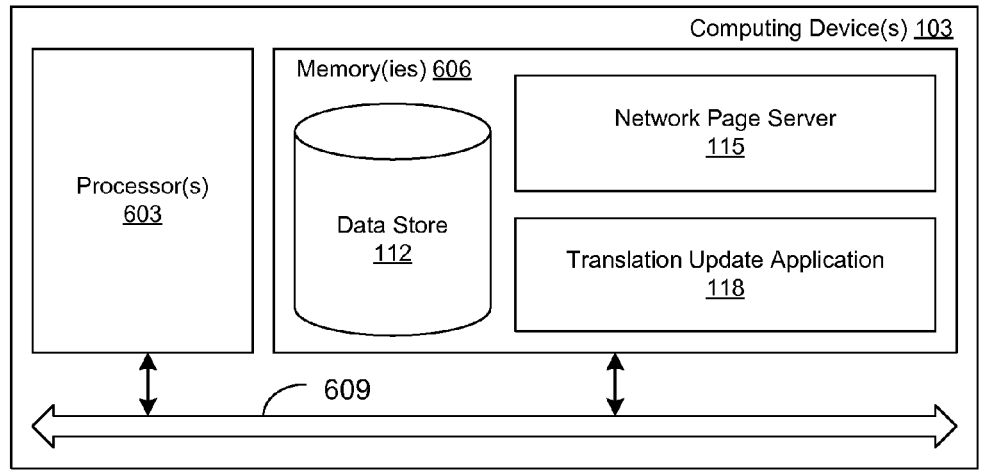
FIG. 6 is a schematic block diagram that provides one example illustration of a computing device employed in the networked environment of FIG. 1 according to various embodiments of the present disclosure.

With reference to FIG. 6, shown is a schematic block diagram of the computing device 103 according to an embodiment of the present disclosure. The computing device 103 includes at least one processor circuit, for example, having a processor 603 and a memory 606, both of which are coupled to a local interface 609. To this end, the computing device 103 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 are the network page server 115, the translation update application 118, and potentially other applications. Also stored in the memory 606 may be a data store 112 and other data. In addition, an operating system may be stored in the memory 606 and executable by the processor 603.

Figure 7:
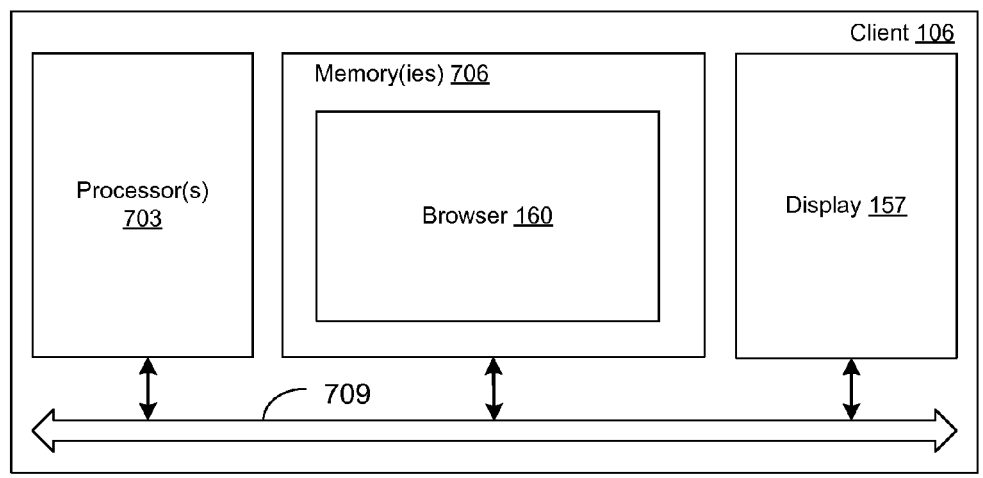
FIG. 7 is a schematic block diagram that provides one example illustration of a client employed in the networked environment of FIG. 1 according to various embodiments of the present disclosure.

Referring next to FIG. 7, shown is a schematic block diagram of the client 106 according to an embodiment of the present disclosure. The client 106 includes at least one processor circuit, for example, having a processor 703 and a memory 706, and a display 157, which are all coupled to a local interface 709. The local interface 709 may comprise, for example, a data bus with an accompanying address/control bus or other bus structure as can be appreciated. The client 106 may also include various peripheral devices coupled to the local interface 709. In particular, peripheral devices may include input devices, for example, a keyboard, keypad, touch pad, touch screen, microphone, scanner, mouse, joystick, or one or more push buttons, etc. The peripheral devices may also include indicator lights, speakers, printers, etc.

Stored in the memory 706 are both data and several components that are executable by the processor 703. In particular, stored in the memory 706 and executable by the processor 703 are the browser 160 and potentially other applications. In addition, an operating system may be stored in the memory 606 and executable by the processor 603.

Referring now to both FIGS. 6 and 7, it is understood that there may be other applications that are stored in the memories 606, 706 and are executable by the processors 603, 703 as can be appreciated. Where any component discussed herein is implemented in the form of software, any one of a number of programming languages may be employed such as, for example, C, C++, C#, Objective C, Java, JavaScript, VBScript, Perl, PHP, Visual Basic, Python, Ruby, Delphi, Flash, Shockwave, or other programming languages.

A number of software components are stored in the memories 606, 706 and are executable by the respective processors 603, 703. In this respect, the term "executable" means a program file that is in a form that can ultimately be run by the processors 603, 703. Examples of executable programs may be, for example, a compiled program that can be translated into machine code in a format that can be loaded into a random access portion of the memories 606, 706 and run by the respective processors 603, 703, source code that may be expressed in proper format such as object code that is capable of being loaded into a random access portion of the memories 606, 706 and executed by the respective processors 603, 703, or source code that may be interpreted by another executable program to generate instructions in a random access portion of the memories 606, 706 to be executed by the respective processors 603, 703, etc. An executable program may be stored in any portion or component of the memories 606, 706 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memories 606, 706 are defined herein as including both volatile and nonvolatile memory and data storage components. Volatile components are those that do not retain data values upon loss of power. Nonvolatile components are those that retain data upon a loss of power. Thus, the memories 606, 706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, each processor 603, 703 may represent multiple processors 603, 703 and each memory 606, 706 may represent multiple memories 606, 706 that operate in parallel processing circuits, respectively. In such a case, the respective local interface 609, 709 may be an appropriate network 109 (FIG. 1) that facilitates communication between any two of the multiple processors 603, 703, between any processor 603, 703 and any of the respective memories 606, 706, or between any two of the respective memories 606, 706, etc. The local interfaces 609, 709 may comprise additional systems designed to coordinate this communication, including, for example, performing load balancing. The processors 603, 703 may be of electrical or of some other available construction.

Although the network page server 115, the translation update application 118, the browser 160, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 2-5 show the functionality and operation of an implementation of portions of the network page server 115, the browser 160, and the translation update application 118. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603, 703 in a computer system or other system. The machine code may be converted from the source code, etc. If embodied in hardware, each block may represent a circuit or a number of interconnected circuits to implement the specified logical function(s).

Although the flowcharts of FIGS. 2-5 show a specific order of execution, it is understood that the order of execution may differ from that which is depicted. For example, the order of execution of two or more blocks may be scrambled relative to the order shown. Also, two or more blocks shown in succession in FIGS. 2-5 may be executed concurrently or with partial concurrence. Further, in some embodiments, one or more of the blocks shown in FIGS. 2-5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the network page server 115, the translation update application 118, the browser 160, the page localization code 139 (FIG. 1), and the translation update interface code 142 (FIG. 1), that comprises software or code can be embodied in any non-transitory computer-readable medium for use by or in connection with an instruction execution system such as, for example, a processor 603, 703 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying at least one program executable in a first computing device, wherein the at least one program causes the first computing device to at least:
    postpone rendering of a network page in the first computing device and render a placeholder in place of the network page;
    determine a locale associated with the first computing device;
    identify a plurality of internationalized elements in the network page, wherein each of the plurality of internationalized elements is identified according to a corresponding attribute that indicates internationalization;
    send a request for a grouping of translations to a second computing device, the request specifying the locale determined by the first computing device;
    obtain the grouping of translations from the second computing device, the grouping of translations including at least one localized translation in a language of the locale and customized for the locale, at least one generic translation in the language of the locale but not customized for the locale, and at least one default translation not in the language of the locale;
    replace each of the plurality of internationalized elements in the network page with a corresponding localized translation in the grouping of translations based at least in part on the locale and a value associated with the corresponding attribute that indicates internationalization; and
    render the network page for display after the network page has been localized.

2. The non-transitory computer-readable medium of claim 1, wherein the at least one program is configured to be cached in the first computing device for localizing a plurality of network pages.

3. The non-transitory computer-readable medium of claim 1, wherein the at least one program further causes the first computing device to at least:

obtain an update to one of the localized translations from a user; and send data describing the update to the second computing device.

4. A computer-implemented method comprising:

obtaining, in a first computing device, a network page and code that localizes the network page from a second computing device;

executing, in the first computing device, the code that localizes the network page, wherein, when executed, the code is configured to cause the first computing device to at least:

determine a locale associated with the first computing device;

identify at least one internationalized element in the network page, the at least one internationalized element comprising an image; and replace the at least one internationalized element in the network page with a corresponding localized translation of the image, wherein the replacing further comprises:

providing, in the first computing device, a first translation of the at least one internationalized element customized for a region associated with the locale and for a language associated with the locale as the corresponding localized translation when the first translation is available;

providing, in the first computing device, a second translation of the at least one internationalized element customized for the language associated with the locale and not customized for the region associated with the locale as the corresponding localized translation when the first translation is unavailable and the second translation is available; and providing, in the first computing device, a third translation of the at least one internationalized element not customized for the language associated with the locale and not customized for the region associated with the locale as the corresponding localized translation when the first translation is unavailable and the second translation is unavailable; and rendering, in the first computing device, the network page for display after the network page has been localized.

5. The computer-implemented method of claim 4, wherein the network page corresponds to a portion of another network page.

6. The computer-implemented method of claim 4, further comprising rendering, in the first computing device, a placeholder message for display before the network page has been localized.

7. The computer-implemented method of claim 4, wherein the at least one internationalized element includes an element selected from the group consisting of a hypertext markup language (HTML) element, an extensible hypertext markup language (XHTML) element, a scalable vector graphics (SVG) element, an extensible markup language (XML) element, and a mathematical markup language (MathML) element.

8. The computer-implemented method of claim 4, wherein the replacing further comprises replacing, in the first computing device, a value associated with a node in a document object model (DOM) element corresponding to the at least one internationalized element with the corresponding localized translation.

9. The computer-implemented method of claim 4, wherein the code that localizes the network page comprises JavaScript.

10. The computer-implemented method of claim 4, wherein the at least one internationalized element includes an attribute that indicates internationalization.

11. The computer-implemented method of claim 10, wherein a value of the attribute that indicates internationalization is a key value that identifies the corresponding localized translation.

12. The computer-implemented method of claim 4, wherein the at least one internationalized element includes an attribute for indicating a source for the corresponding localized translation.

13. The computer-implemented method of claim 12, wherein the attribute for indicating the source has a key value that identifies a grouping of translations that includes the corresponding localized translation.

14. The computer-implemented method of claim 13, wherein the code that localizes the network page is further configured to cause the first computing device to obtain the grouping of translations from the second computing device based at least in part on the key value and the locale.

15. The computer-implemented method of claim 13, further comprising obtaining, in the first computing device, a plurality of groupings of translations from the second computing device, the groupings of translations including the grouping of translations.

16. The computer-implemented method of claim 13, further comprising:

storing, in the first computing device, the grouping of translations in a cache; and executing, in the first computing device, the code that localizes the network page to localize a portion of the network page that has been updated, wherein the code that localizes the network page is configured to load the grouping of translations from the cache.

17. The computer-implemented method of claim 4, further comprising:

obtaining, in the first computing device, a corrected version of the corresponding localized translation from a user; and sending, in the first computing device, the corrected version of the corresponding localized translation to the second computing device.

18. The computer-implemented method of claim 4, further comprising:

storing, in the first computing device, the code that localizes the network page in a cache; and loading, in the first computing device, the code that localizes the network page from the cache to localize another network page.

19. A system comprising:

a first computing device configured to at least:

obtain a request for a network page from a second computing device; and send the network page to the second computing device in response to the request, wherein the network page includes code that localizes the network page that is executable in the second computing device, the code that localizes the network page, when executed, causing the second computing device to at least:

determine a locale associated with the second computing device;

obtain at least one grouping of translations from the first computing device based at least in part on the locale, wherein the at least one grouping of translations including at least one localized translation in a language of the locale and customized for the locale, at least one generic translation in the language of the locale but not customized for the locale, and at least one default translation not in the language of the locale;

identify a plurality of internationalized elements in the network page, individual ones of the plurality of internationalized elements including an attribute that indicates a respective source for a corresponding localized translation;

replace the individual ones of the plurality of internationalized elements in the network page with the corresponding localized translation obtained from the first computing device at the respective source; and wherein the second computing device is configured to render the network page for display after the network page has been localized.

20. The system of claim 19, wherein the code that localizes the network page, when executed, further causes the second computing device to render a placeholder for display while the network page is being localized.

21. The system of claim 19, wherein the network page includes code for generating a user interface to obtain an update to the corresponding localized translation.

22. The system of claim 19, wherein the first computing device is further configured to at least:

obtain an update to the corresponding localized translation from the second computing device;

determine whether the second computing device has permission to update the corresponding localized translation; and update a stored version of the corresponding localized translation according to the update when the second computing device has permission.

23. The system of claim 19, wherein the corresponding localized translation is an image.

* * * * *